United States Patent Office 3,342,796
Patented Sept. 19, 1967

3,342,796
ISOLATION OF CYTOCHROME C EMPLOYING A DILUTE ALUMINUM SULFATE SOLUTION
Emanuel Margoliash, Glencoe, and Otto F. Walasek, Zion, Ill., assignors to Abbott Laboratories, North Chicago, Ill., a corporation of Illinois
No Drawing. Filed Apr. 30, 1964, Ser. No. 364,016
4 Claims. (Cl. 260—115)

The present invention is directed to a new and improved method for the isolation of cytochrome C. More particularly, it is concerned with a practical and fast method for extracting pure mammalian-type cytochrome C from vertebrate tissue.

Cytochrome C is a heme protein having as prosthetic groups a substituted meso-porphyrin iron with covalent porphyrin protein linkages. Such proteins have been prepared from an extremely wide range of organisms; they exhibit a similarly wide range of protein and hemochrome properties. The present method is concerned primarily with the isolation of a type of cytochrome C. (hereinafter called "mammalian type") which occurs in the tissue of mammals, birds, fish, and other vertebrates.

Although the mammalian type of cytochrome C has been considered a particularly stable protein, most available preparations contain a variety of so-called "modified" molecules or artifacts which are a result of the conditions used in the extraction method and often have a major influence on the functional activity of the preparation in various enzyme systems. Some of the artifacts are polymerization products, others are deaminated molecules and, particularly with the latter, separation of the natural protein from the artifactual form is extremely difficult. It is apparent from existing isolation procedures that these artifacts are often obtained in considerable quantities, mainly due to exposure to certain media used in the extraction process. Since the artifacts are formed during the isolation process from the desired cytochrome C, considerable losses of the latter occur, so that uneconomical yields are obtained and the workup procedure becomes so complicated that it makes final purification impractical.

The main reason why older isolation methods cause the formation of artifacts is the acid treatment required in these processes. The classic method, for instance, calls for extracting the mammalian tissue with trichloroacetic acid, followed by precipitation of extraneous proteins with ammonium sulfate. The product obtained in this manner contains some 25% of artifacts, and in the purification step, large volumes have to be handled to produce only small yields. According to a newer method, acetic acid is used for the extraction, followed by precipitation and dialysis. Again, considerable losses occur due to artifact formation. In addition, both of these methods require a considerable amount of time for the isolation procedure.

It is therefore an object of the present invention to provide a new and improved method for the isolation of cytochrome C. It is another object to provide an isolation procedure for cytochrome C from the tissue of vertebrates which substantially prevents formation of polymeric or deaminated artifacts. It is a further object of the present invention to provide an isolation method for cytochrome C which produces high yields of the latter by a simple, economical and fast procedure.

These and other objects are accomplished by extracting minced mammalian tissue for at least two hours with 2–8 volumes of a dilute aqueous solution of aluminum sulfate at a pH of 4.3–5.0, filtering the mass, adjusting the pH of the filtrate to 8.0–8.5, and eliminating the precipitated aluminum hydroxide. The dilute aluminum sulfate solution is preferably of a concentration of 0.25% to 0.75%. With much lower concentrations, the volume tends to get impractically large, and with much higher concentrations the adsorption step needed in the purification step may cause undue difficulty.

The clear solution obtained in the above manner is virtually free of deaminated or polymerized cytochrome C and requires only the further purification steps well known from the prior art. The new method produces a much higher yield of cytochrome C than prior art methods and requires much less time than older methods. The further purification steps include absorbing the above solution on a weak cation exchange resin, eluting the resin with a 0.3–1.0 molar aqueous salt solution of a pH of 8.0–8.5 and, if desired, further chromatograms to eliminate last traces of accompanying impurities.

The above term "weak cation exchange resin" refers to a cation exchange material which is capable of absorbing a basic protein material of molecular weight between 12,000 and 13,000, e.g. ground methacrylic carboxylic acid resins such as Amberlite IRC–50 (marketed by Rohm and Haas) and the like.

The new process distinguishes materially over older methods by using aluminum sulfate as the extractant, so that no deleterious acidic digestion of the tissue is necessary prior to the extraction step. Aluminum sulfate is particularly well suited as an extractant because by varying the concentration thereof, the pH can be adjusted to the desired range of between 4.3 and 5.0. With this method, cytochrome C does not undergo any measurable alteration; specifically, no polymerization or deamination occurs. For this reason, almost all cytochrome C present in the tissue can be recovered in a strictly native form, that is, in the enzymatically most highly-active form. As a practical advantage of the present method, no dialysis is necessary prior to the absorption of the material on the exchange resin as was required by older processes. The new method is therefore much simpler and, particularly, much faster than older methods, allowing for instance, with ordinary laboratory equipment, the extraction of cytochrome C from 50 pounds of mammalian tissue in two to four days, producing about 20 micromoles per kilogram of heart tissue (or the recovery 80–85% of the total content of the tissue), while older methods required, for an equal amount of tissue, periods of four to eight days with recoveries of only about 40% of the total cytochrome C present.

In a simple embodiment of the present invention, one part by weight of coarsely ground animal tissue is homogenized in a Waring blendor for 15–20 seconds with 2–8 parts by volume of 0.3–0.5% aqueous aluminum sulfate hydrate solution. The mixture is adjusted to a pH of 4.5 by adding sufficient aluminum sulfate and is maintained at room temperature for at least two hours with occasional stirring. The mass is filtered at a temperature of 2–4° C. and the filtrate is adjusted to a pH of between 8.0 and 8.5 with dilute aqueous ammonium hydroxide. After filtering off the precipitated aluminum hydroxide, preferably by adding a small amount of a filter aid, the filtrate is rapidly passed through a wide column containing a weak cation exchange resin buffered to a pH of 8.0–8.5. The cytochrome C collects in its reduced form. The column is washed with a buffer containing 0.02 gram per liter of sodium cation and the cytochrome C is then eluted with a 0.5 molar aqueous sodium chloride solution buffered to a pH of 8.0 to 8.5. The eluate is oxidized with the minimum amount of potassium ferricyanide and brought to 80% saturation by adding the required amount of ammonium sulfate. The precipitate is filtered off and the filtrate is dialyzed against deionized water, adding 200–300 mg. per liter of solid disodium phosphate inside each dialysis bag. To obtain maximum recovery of cytochrome C, the procedure up to this point should be and can easily be carried out within 12–14 hours, while older methods require several days.

The cytochrome C may be chromatographed on a column of methacrylic carboxylic acid resin of pH 7.0 using a linear gradient of sodium ion concentration from 0.02 molar sodium phosphate buffer of pH 7.0 to the same buffer containing 1.0 molar sodium chloride. The native cytochrome C elutes in a single peak. The colored fractions are then pooled, dialyzed overnight, and concentrated on a small cation exchange resin column as before. On careful saturation of the concentrated solution with ammonium sulfate, cytochrome C crystallizes rapidly within 30 minutes.

By following the above method, the yields obtained are much greater than those obtainable by older processes which took considerably more time. As illustration, horse heart produces 17–20 micromoles per kilogram of tissue, beef heart produces 14–16 micromoles per kilogram, and human heart produces 10–12 micromoles per kilogram of tissue.

To better understand the process of the present invention, reference is made to the following example which is given here as illustration only and is not meant to set any limitation on the inventive process.

*Example*

Chopped pieces of 22.62 kg. of frozen horse heart are minced through a meat grinder. The ground meat is homogenized with 2 volumes of 0.5% aqueous aluminum sulfate solution in a Waring blendor for one minute, giving a thick suspension of pH 4.8. By adding more aluminum sulfate solution, the slurry is brought to a pH of 4.5. A total of 50 liters of the aluminum sulfate solution is used and the total volume of the slurry is then adjusted to 80 liters by the addition of distilled water. After leaving the slurry at room temperature for 2 hours, it is filtered on large gravity flow paper filters in a room maintained at a temperature of 2–4° C. The filtrate with a pH of 4.55 is adjusted to a pH of 8.0 with dilute ammonium hydroxide solution. After adding 2 grams of a filter-aid per liter of solution, the solution is again passed through a gravity flow paper filter. The clarified extract of about 80 liters at pH 8.0 is then passed through six inches of a column of 6-inch diameter filled with the sodium form of a cation exchange resin (Amberlite CG–50, a finely-ground resin of 200–400 mesh size, marketed by Rohm and Haas) adjusted to a pH of 8.0. To augment the flow rate, vacuum is used at the bottom outlet of the column. After absorption of the material on the resin, the latter is thoroughly washed with distilled water adjusted to a pH of 8.5 with ammonium hydroxide.

The cytochrome C is eluted from the resin column by passing one liter of a 5% ammonium sulfate solution buffered to pH 8.5 with ammonium hydroxide through the column. To the eluate, 520 grams of ammonium sulfate is added and a few drops of concentrated ammonia to keep the pH above 7.0. The eluate is now 80% saturated with ammonium sulfate and the precipitate forming at this concentration is filtered off. The clear filtrate is dialyzed against distilled water adjusted to a pH of 8.5, adding 200 mg. of disodium phosphate inside each dialysis bag. The dialysis membrane used is a semipermeable, regenerated cellulose dialysis tubing (sausage casing), allowing ammonium sulfate to pass through but not the large molecules of cytochrome C. The water in the dialysis bag is replaced with fresh solution five times in two days. The cytochrome C is adsorbed onto a 4 x 60 cm. column of Amberlite resin buffered to pH 7.0. The protein is eluted under a linear gradient of Na$^+$ concentration from 0.05 to 0.5 M. The cytochrome C appears in a fraction of about 750 ml. with a total of 6000 ml. linear gradient solution used. The protein collected exhibits no reaction (0% combination) with carbon monoxide throughout the chromatographic peak. The fractions containing the protein are pooled and dialyzed overnight as described above. The protein is reabsorbed on a 4 x 10 cm. column of the resin, eluted with 0.5 M NaCl, dialyzed exhaustively as above, and lyophilized. The final material has a ration of optical densities at 550 m$\mu$ (reduced) to 280 m$\mu$ (oxidized) of 1.23. A total of 4.82 grams of pure cytochrome C is obtained, representing a yield of 213 mg./kg. of extracted tissue.

It will be seen from the above example that the process of the present invention produces large yields of cytochrome C in a simple and economical operation, producing high yields in shorter times than any previous extraction method known for cytochrome C. The above method, as will be appreciated readily by those skilled in the art, can be modified in many ways; for instance, the aluminum sulfate solution used may be of a concentration between 0.25% and 0.75%, the pH adjustment can be performed in other accepted ways, and the selection of the pH before and after the filtration of the slurry can be varied within the ranges given; other cation exchange resins may be substituted for the Amberlite CG–50 used above, and the dialysis step recited above may be replaced by other known forms of concentrating a salt solution of a protein material.

Others may practice the invention in any of the numerous ways which will be apparent to one skilled in the art by the present disclosure. All such practice of the invention is considered a part hereof, provided it falls within the scope of the appended claims.

We claim:

1. In the process of isolating cytochrome C, comprising digesting mammalian tissue, filtering and adsorbing the digested cytochrome C extract on a cation exchange resin, and eluting the resin with a weakly basic salt solution the improvement consisting in digesting homogenized mammalian tissue for at least 2 hours with 2–8 volumes of a dilute aqueous solution of aluminum sulfate at a pH of 4.3–5.0, filtering the mass, adjusting the pH of the filtrate to 8.0–8.5, and eliminating the precipitated aluminum hydroxide.

2. The process of claim 1 wherein said aluminum hydroxide is eliminated by filtration.

3. The process of claim 1 wherein said aluminum hydroxide is eliminated by centrifugation.

4. The process of claim 1 wherein said dilute aqueous aluminum sulfate solution has a concentration between 0.25% and 0.75%.

No references cited.

WILLIAM H. SHORT, *Primary Examiner.*

H. SCHAIN, *Assistant Examiner.*